US012623855B2

(12) United States Patent
Abe et al.

(10) Patent No.: US 12,623,855 B2
(45) Date of Patent: May 12, 2026

(54) TRANSFER SYSTEM

(71) Applicant: DAIFUKU CO., LTD., Osaka (JP)

(72) Inventors: Takeshi Abe, Shiga (JP); Hiroyuki Nakagawa, Komaki (JP); Hiroyoshi Toba, Komaki (JP)

(73) Assignee: DAIFUKU CO., LTD., Osaka (JP)

( * ) Notice: Subject to any disclaimer, the term of this patent is extended or adjusted under 35 U.S.C. 154(b) by 4 days.

(21) Appl. No.: 18/662,385

(22) Filed: May 13, 2024

(65) Prior Publication Data

US 2024/0391701 A1 Nov. 28, 2024

(30) Foreign Application Priority Data

May 24, 2023 (JP) .................................. 2023-085767

(51) Int. Cl.
B65G 43/08 (2006.01)

(52) U.S. Cl.
CPC ...... B65G 43/08 (2013.01); *B65G 2203/0266* (2013.01); *B65G 2811/097* (2013.01)

(58) Field of Classification Search
CPC ............ B65G 43/08; B65G 2203/0266; B65G 2811/097
USPC ........................................................... 198/1
See application file for complete search history.

(56) References Cited

U.S. PATENT DOCUMENTS

2021/0380348 A1    12/2021  Futami et al.
2023/0001569 A1*   1/2023   Gandhi .................... B25J 13/08

2023/0271791 A1*   8/2023   Graston ................. B65G 47/90
                                                       700/226
2023/0271797 A1*   8/2023   Sun ........................ B25J 9/1682
                                                       700/230
2023/0348186 A1    11/2023  Siraisi et al.

FOREIGN PATENT DOCUMENTS

JP     2000-118638  A    4/2000
JP     2000-118639  A    4/2000
JP     2005-075494  A    3/2005
JP     2021-079348  A    5/2021
JP     2022-023337  A    2/2022
WO     2020/090323  A1   5/2020
WO     WO2023217450      *  11/2023

OTHER PUBLICATIONS

Office Action dated Nov. 18, 2025 issued in Japanese patent application No. 2023-085767.

* cited by examiner

*Primary Examiner* — Gene O Crawford
*Assistant Examiner* — Lester Ill Rushin
(74) *Attorney, Agent, or Firm* — Harness, Dickey & Pierce, P.L.C.

(57) ABSTRACT

This invention provides a transfer system capable of efficiently transferring, by use of a bidirectional conveyor, a transfer target between different points. The transfer system include a control device that: executes, in an alternate manner, a first mode in which a transfer target on a conveyor mechanism of a bidirectional conveyor device is transferred in a first direction and a second mode in which a transfer target is transferred in a second direction reverse to the first direction; and continues the first mode according to a predetermined first period defining a duration of the first mode.

5 Claims, 4 Drawing Sheets

FIG. 2

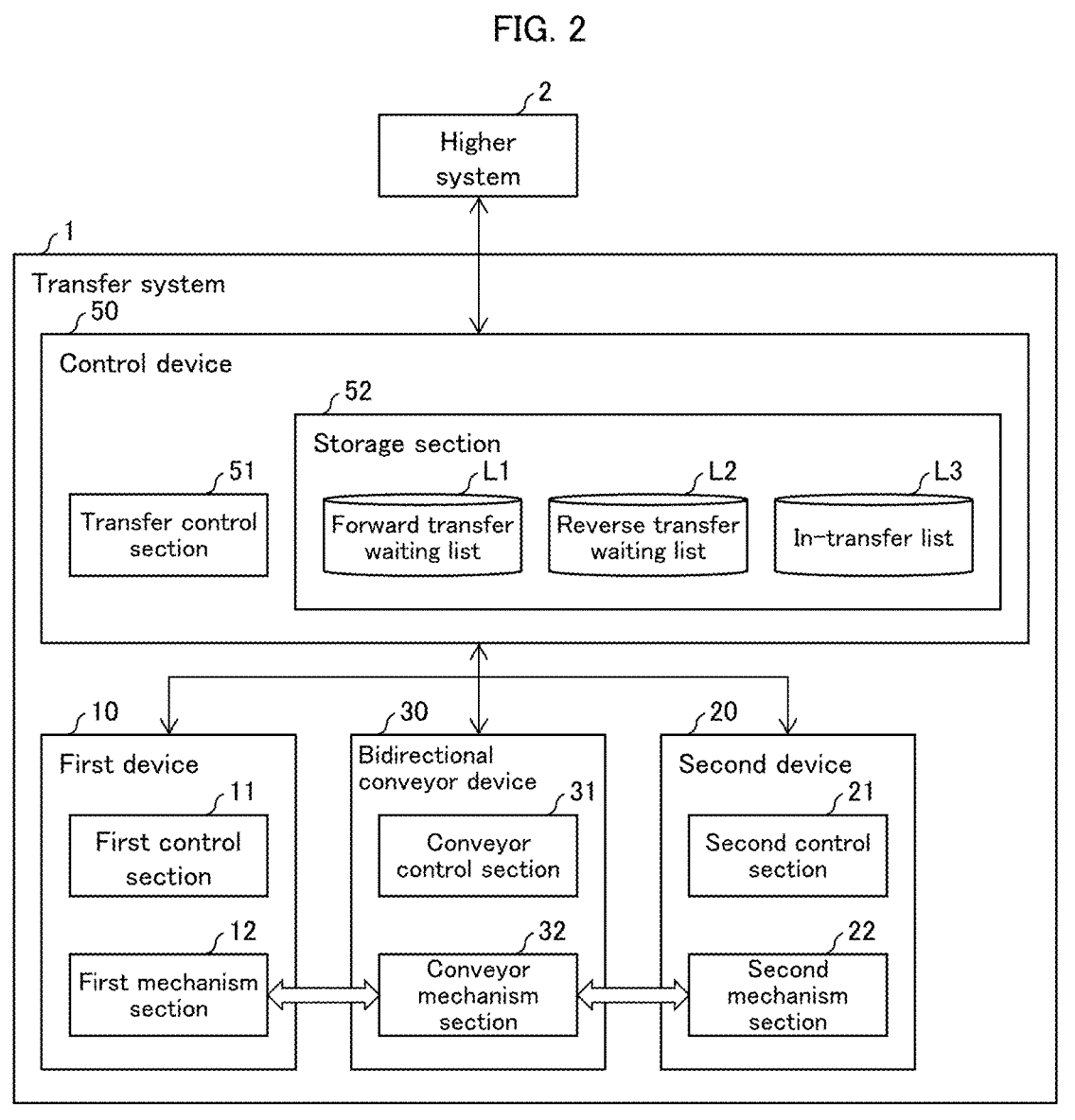

```
                        ┌──────────────┐ ⌐2
                        │   Higher     │
                        │   system     │
                        └──────────────┘
                               ↕
┌─ 1 ─────────────────────────────────────────────────────────────┐
│ Transfer system                                                  │
│  ⌐50                                                             │
│ ┌─ Control device ─────────────────────────────────────────────┐│
│ │                        ⌐52                                    ││
│ │           ┌─ Storage section ──────────────────────────────┐ ││
│ │     ⌐51   │           ⌐L1          ⌐L2            ⌐L3       │ ││
│ │ ┌───────┐ │ ┌─────────┐ ┌─────────┐ ┌─────────────┐       │ ││
│ │ │Transfer│ │ │Forward  │ │Reverse  │ │             │       │ ││
│ │ │control │ │ │transfer │ │transfer │ │In-transfer  │       │ ││
│ │ │section │ │ │waiting  │ │waiting  │ │    list     │       │ ││
│ │ └───────┘ │ │ list    │ │ list    │ └─────────────┘       │ ││
│ │           │ └─────────┘ └─────────┘                       │ ││
│ │           └──────────────────────────────────────────────┘ ││
│ └──────────────────────────────────────────────────────────────┘│
│                               ↕                                  │
│   ⌐10              ⌐30                     ⌐20                   │
│ ┌──────────┐    ┌──────────────┐        ┌──────────────┐        │
│ │First     │    │Bidirectional │        │Second device │        │
│ │device    │    │conveyor      │        │              │        │
│ │     ⌐11  │    │device   ⌐31  │        │        ⌐21   │        │
│ │┌────────┐│    │┌───────────┐ │        │┌────────────┐│        │
│ ││First   ││    ││Conveyor   │ │        ││Second      ││        │
│ ││control ││    ││control    │ │        ││control     ││        │
│ ││section ││    ││section    │ │        ││section     ││        │
│ │└────────┘│    │└───────────┘ │        │└────────────┘│        │
│ │     ⌐12  │    │        ⌐32   │        │        ⌐22   │        │
│ │┌────────┐│    │┌───────────┐ │        │┌────────────┐│        │
│ ││First   ││⟷  ││Conveyor   │ │⟷      ││Second      ││        │
│ ││mechanism││    ││mechanism  │ │        ││mechanism   ││        │
│ ││section ││    ││section    │ │        ││section     ││        │
│ │└────────┘│    │└───────────┘ │        │└────────────┘│        │
│ └──────────┘    └──────────────┘        └──────────────┘        │
└──────────────────────────────────────────────────────────────────┘
```

TRANSFER SYSTEM

This Nonprovisional application claims priority under 35 U.S.C. § 119 on Patent Application No. 2023-085767 filed in Japan on May 24, 2023, the entire contents of which are hereby incorporated by reference.

TECHNICAL FIELD

The present invention relates to a transfer system.

BACKGROUND ART

There has been known a bidirectional conveyor capable of bidirectionally transferring a transfer target.

CITATION LIST

Patent Literature

[Patent Literature 1]
International Publication No. WO 2020/090323

SUMMARY OF INVENTION

Technical Problem

However, a bidirectional conveyor disclosed in Patent Literature 1 is provided as a backup line for a conveyor disposed side by side therewith, and is not configured to convey a transfer target in a normal state. Thus, Patent Literature 1 does not disclose a specific control method used to transfer a transfer target between different points by use of the bidirectional conveyor.

An aspect of the present invention has an object to provide a transfer system capable of efficiently transferring a transfer target between different points by use of a bidirectional conveyor.

Solution to Problem

In order to attain the object, a transfer system in accordance with an aspect of the present disclosure includes: a bidirectional conveyor device including a conveyor mechanism capable of transferring a transfer target bidirectionally; and a control device, the control device being configured to control the bidirectional conveyor device to execute a first mode and a second mode alternately, the first mode being a transfer mode for transferring a transfer target on the conveyor mechanism in a first direction, the second mode being a transfer mode for transferring a transfer target on the conveyor mechanism in a second direction opposite to the first direction, the control device being further configured to continue the first mode according to a predetermined first period defining a duration of the first mode.

A control device in accordance with each aspect of the present invention can be realized by a computer. In this case, the present invention encompasses: (i) a control program for the control device, the control program causing the computer to implement the control device by causing the computer to operate as each section (software element) provided in the control device; and (ii) a computer-readable storage medium in which the control program is stored.

Advantageous Effects of Invention

In accordance with an aspect of the present invention, it is possible to provide a transfer system capable of efficiently transferring a transfer target between at least two points by use of a bidirectional conveyor.

BRIEF DESCRIPTION OF DRAWINGS

FIG. 2 is a functional block diagram illustrating a configuration of the transfer system in accordance with the first embodiment of the present invention.

DESCRIPTION OF EMBODIMENTS

First Embodiment

Figure 1:
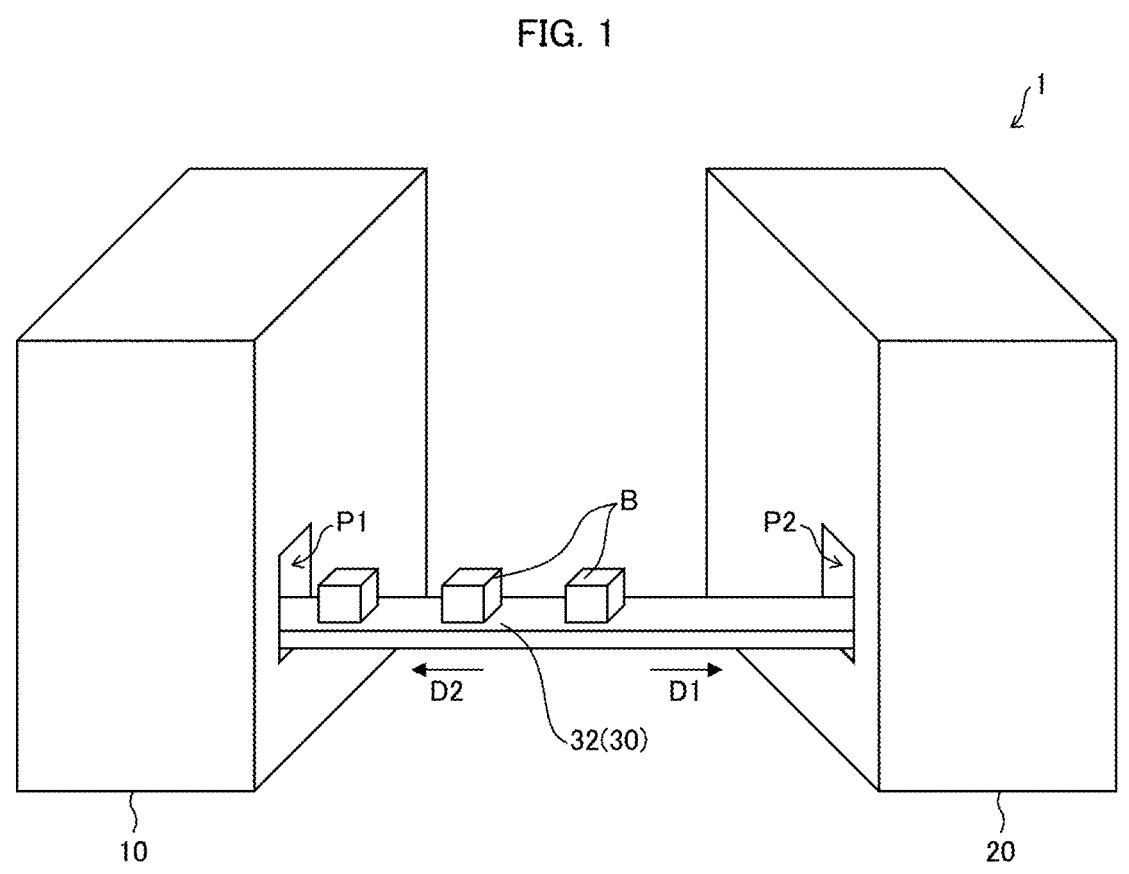
FIG. 1 is a view illustrating an overview of a transfer system in accordance with a first embodiment of the present invention.

The following will give a detailed description of an embodiment of the present invention. FIG. 1 is a view schematically illustrating an overview of a transfer system 1 in accordance with a first embodiment. FIG. 2 is a functional block diagram illustrating a configuration of the transfer system 1.

The transfer system 1 includes a first device 10, a second device 20, a bidirectional conveyor device 30, and a control device 50. In the transfer system 1, these devices are mutually communicable, and can exchange information with each other. The control device 50 of the transfer system 1 is communicable with a higher system 2. The control device 50 and the higher system 2 can exchange information with each other.

The higher system 2 is, for example, an information processing system that manages production of a product in a process in a factory. The higher system 2 gives, to the control device 50 of the transfer system 1, an instruction to transfer an individual article(s) such as a product(s), a semifinished product(s), a material(s), and/or a jig(s). An article for a transfer instruction is given by the higher system 2 to the control device 50 is a transfer target B in the transfer system 1.

<Bidirectional Conveyor Device 30>

The bidirectional conveyor device 30 includes a conveyor control section 31 and a conveyor mechanism section 32 controlled by the conveyor control section 31. The bidirectional conveyor device 30 is configured to transfer the transfer target B on the conveyor mechanism section 32 in a first direction D1 and a second direction D2 reverse to the first direction D1.

In the transfer system 1, the first direction D1 refers to a direction in which the transfer target B is transferred from the first device 10 to the second device 20, whereas the second direction D2 refers to a direction in which the transfer target B is transferred from the second device 20 to the first device 10. For easy understanding of the description of operation of the transfer system 1, the first direction D1 may also be described as a "forward direction D1" and the second direction D2 may also be described as a "reverse direction D2". These expressions are used for convenience. Further, in the following description, transfer in the first direction D1 (forward direction) is described as "forward transfer", and transfer in the second direction D2 (reverse direction) is expressed as "reverse transfer".

The bidirectional conveyor device 30 can execute the following operation. The conveyor control section 31 of the bidirectional conveyor device 30 receives, from the control device 50, an instruction to carry out forward transfer. In response to this, the conveyor control section 31 controls the conveyor mechanism section 32 so as to cause the conveyor mechanism section 32 to execute forward transfer.

Further, the conveyor control section 31 receives, from the control device 50, an instruction to carry out reverse transfer. In response to this, the conveyor control section 31 controls the conveyor mechanism section 32 so as to cause the conveyor mechanism section 32 to execute reverse transfer. Furthermore, the conveyor control section 31 receives, from the control device 50, an instruction for stopping. In response to this, the conveyor control section 31 controls the conveyor mechanism section 32 so as to stop the conveyor mechanism section 32.

<First Device 10, Second Device 20>

The first device 10 includes a first control section 11 and a first mechanism section 12 which is controlled by the first control section 11. The first mechanism section 12 of the first device 10 can deliver or receive the transfer target B to or from the conveyor mechanism section 32 of the bidirectional conveyor device 30. During this, the first mechanism section 12 delivers or receives the transfer target B at a first position P1 on the conveyor mechanism section 32.

The second device 20 includes a second control section 21 and a second mechanism section 22 which is controlled by the second mechanism section 21. The second mechanism section 22 of the second device 20 can deliver or receive the transfer target B to or from the conveyor mechanism section 32 of the bidirectional conveyor device 30. During this, the second mechanism section 22 delivers or receives the transfer target B at a second position P2 on the conveyor mechanism section 32.

Each of the first device 10 and the second device 20 can be, for example, a stocker for storing an article. In this case, the first mechanism section 12 can cause the transfer target B to be housed in a given position inside the first device 10 or can take out the transfer target B housed in the given position. This is also true of the second device 20. The first device 10 or the second device 20 may include a port via which the first device 10 or the second device 20 can appropriately deliver or receive the transfer target B to or from a device other than the bidirectional conveyor device 30.

At least one of the first device 10 and the second device 20 may be a device which is not a stocker. Given that the first device 10 is a device that can deliver or receive a given transfer target B to or from the bidirectional conveyor device 30 at the first position P1 on the conveyor mechanism section 32, the first device 10 may be a ceiling-traveling transfer system, a manufacturing device that carries out a given process on a semifinished product or the like, an inspection device, or the like. This is also true of the second device 20.

The first device 10 can execute the following operation. The first control section 11 of the first device 10 receives, from the control device 50, an instruction to deliver a given article in the first device 10 to the bidirectional conveyor device 30. In response to this, the first control section 11 controls the first mechanism section 12 to take out the article from the position where the article is housed, and then delivers the article as the transfer target B to the bidirectional conveyor device 30 at the first position P1 on the conveyor mechanism section 32.

Further, upon reception of an instruction to receive the transfer target from the control device 50, the first control section 11 enters a state (reception waiting state) in which the transfer target B transferred by the conveyor mechanism section 32 of the bidirectional conveyor device 30 is acceptable. When the first control section 11 detects, in this manner, that the transfer target B has been transferred to the first position P1, the first control section 11 controls the first mechanism section 12 to pick up the transfer target B from the conveyor mechanism section 32. That is, the first device 10 receives the transfer target B from the bidirectional conveyor device 30.

Further, the first control section 11 gives, to the control device 50, a report of information about the received transfer target B. For this purpose, the first device 10 includes an appropriate sensor for detecting identification information of the transfer target B. The identification information of the transfer target B may be indicated by a sign, a mark, a barcode, or the like on an outer surface of the transfer target B. Alternatively, the identification information of the transfer target B may be indicated as a result of reading a Radio Frequency Identification (RFID) tag provided to the transfer target B.

In this manner, the first control section 11 controls the first mechanism section 12 so that the received transfer target B is housed in an appropriate housing position inside the first device 10. When receiving, from the control device 50, cancellation of the instruction to receive the transfer target, the first control section 11 stops the first device 10 from receiving the transfer target B transferred by the conveyor mechanism section 32 of the bidirectional conveyor device 30 (i.e., stops the reception waiting state).

The second device 20 can execute the following operation. The second control section 21 of the second device 20 receives, from the control device 50, an instruction to deliver a given article in the second device 20 to the bidirectional conveyor device 30. In response to this, the second control section 21 controls the second mechanism section 22 to take out the article from the position where the article is housed, and then delivers the article as the transfer target B to the bidirectional conveyor device 30 at the second position P2 on the conveyor mechanism section 32.

Further, when receiving, from the control device 50, an instruction to receive the transfer target, the second control section 21 enters a state (reception waiting state) in which the transfer target B transferred by the conveyor mechanism section 32 of the bidirectional conveyor device 30 is acceptable. When the second control section 21 detects, in this manner, that the transfer target B has been transferred to the second position P2, the second control section 21 controls the second mechanism section 22 to pick up the transfer target B from the conveyor mechanism section 32. That is, the second device 20 receives the transfer target B from the bidirectional conveyor device 30.

Further, the second control section 21 gives, to the control device 50, a report of information about the received transfer target B. For this purpose, the second device 20 includes an appropriate sensor for detecting identification information of the transfer target B. In this manner, the second control section 21 controls the second mechanism section 22 so that the received transfer target B is housed in a given housing position inside the second device 20. When receiving, from the control device 50, cancellation of the instruction to receive the transfer target, the second control section 21 stops the second device 20 from receiving the transfer target B transferred by the conveyor mechanism section 32 of the bidirectional conveyor device 30 (i.e., stops the reception waiting state).

<Control Device 50>

The control device 50 includes a transfer control section 51 and a storage section 52, which is a memory for storing information therein. The storage section 52 has a forward transfer waiting list L1, a reverse transfer waiting list L2, and an in-transfer list L3.

In response to an instruction to transfer an article which instruction is given by the higher system 2, the transfer control section 51 determines an operation mode of the transfer system 1. As the operation mode of the transfer system 1, there are three modes, that is, a stop mode, a first mode, and a second mode. These modes will be described later. According to an operation mode and an article transfer instruction from the higher system 2, the transfer control section 51 appropriately gives, to the first device 10, the second device 20, and the bidirectional conveyor device 30, instructions for these devices. This realizes efficient bidirectional transfer between the first device 10 and the second device 20.

Since the control device 50 is an information processing system, the control device 50 may be constituted by, for example, a set of a general-purpose computer, as is known with regard to the information processing system. However, this is not limitative. That is, the function of the transfer control section 51 may be constructed in a plurality of devices which are arranged in a dispersed manner, from a physical perspective. Further, each of the lists L1 to L3 stored in the storage section 52 may also be constituted in a plurality of devices which are arranged in a dispersed manner, from a physical perspective.

For example, the whole of or a part of the function of the transfer control section 51 may be constructed substantially integrally with the higher system 2. Further, information processing realized by the whole or a part of the function of the transfer control section 51 may be executed in the first device 10, the second device 20, or the bidirectional conveyor device 30. For example, the whole of or a part of each of the lists L1 to L3 in the storage section 52 may be substantially integrally incorporated into the higher system 2. Further, the whole of or a part of each of the lists L1 to L3 may be stored in the first device 10, the second device 20, or the bidirectional conveyor device 30.

<Overview of Operation of Transfer System 1>

The following will describe operation of the transfer system 1. First, an overview of the operation of the transfer system 1 will be discussed. In a case where both (i) transfer targets B that are to be transferred from the first device 10 to the second device 20 and (ii) transfer targets B that are to be transferred from the second device 20 to the first device 10 are present in a sufficient quantity, the transfer system 1 operates in the following manner.

The transfer system 1 executes the first mode and the second mode alternately. Here, the first mode refers to a transfer mode in which the transfer target B which is to be transferred (forward transfer) from the first device 10 to the second device 20 is transferred (forward transfer) from the first device 10 to the second device 20 by use of the bidirectional conveyor device 30. The second mode refers to a transfer mode in which the transfer target B which is to be transferred (reverse transfer) from the second device 20 to the first device 10 is transferred (reverse transfer) from the second device 20 to the first device 10 by use of the bidirectional conveyor device 30.

That is, the first mode may also be expressed as a transfer mode in which the transfer target B on the conveyor mechanism is transferred in the forward direction D1 (first direction). The second mode may also be expressed as a transfer mode in which the transfer target B on the conveyor mechanism is transferred in the reverse direction D2 (second direction).

In this case, switching between the first mode and the second mode is carried out in the following manner. If a predetermined first period that defines a duration of the first mode has elapsed since start of the first mode, i.e., if the first period expires, the transfer system 1 completes transferring the transfer target B which is being transferred at that point of time, and switches the operation mode to the second mode. Note, however, that this does not apply when there is no transfer target B which is to be transferred (reverse transfer) from the second device 20 to the first device 10.

If a predetermined second period that defines a duration of the second mode has elapsed since start of the second mode, i.e., if the second period expires, the transfer system 1 completes transferring the transfer target B which is being transferred at that point of time, and switches the operation mode to the first mode. Note, however, that this does not apply when there is no transfer target B which is to be transferred (forward transfer) from the first device 10 to the second device 20.

Meanwhile, in a case where, during the first period, there is no more transfer target B which is to be transferred in the first mode and there is a transfer target B which is to be transferred in the second mode, the transfer system 1 completes transferring a transfer target B which is being transferred at that point of time, and then switches the operation mode to the second mode even before the first period ends. Similarly, in a case where, during the second period, there is no more transfer target B which is to be transferred in the second mode and there is a transfer target B which is to be transferred in the first mode, the transfer system 1 completes transferring a transfer target B which is being transferred at that point of time, and then switches the operation mode to the first mode.

That is, in a case where, during the first period, there is no transfer target B which is to be transferred from the first device 10 to the second device 20 by use of the bidirectional conveyor device 30 and there is a transfer target B which is to be transferred from the second device 20 to the first device 10 by use of the bidirectional conveyor device 30, the transfer system 1 switches, even before the first period ends, the operation mode to the second mode after a transfer target B which is being transferred arrives at the second position P2.

Similarly, in a case where, during the second period, there is no more transfer target B which is to be transferred from the second device 20 to the first device 10 by use of the bidirectional conveyor device 30 and there is a transfer target B which is to be transferred from the first device 10 to the second device 20 by use of the bidirectional conveyor device 30, the transfer system 1 switches, even before the second period ends, the operation mode to the first mode after a transfer target B which is being transferred arrives at the first position P1.

In this manner, the transfer system 1 uses a set of conveyor device to switch a transfer direction of the conveyor device from one to another by an appropriate method, so as to realize efficient bidirectional transfer.

<Details of Operation of Devices in Transfer System 1>

Figure 3:
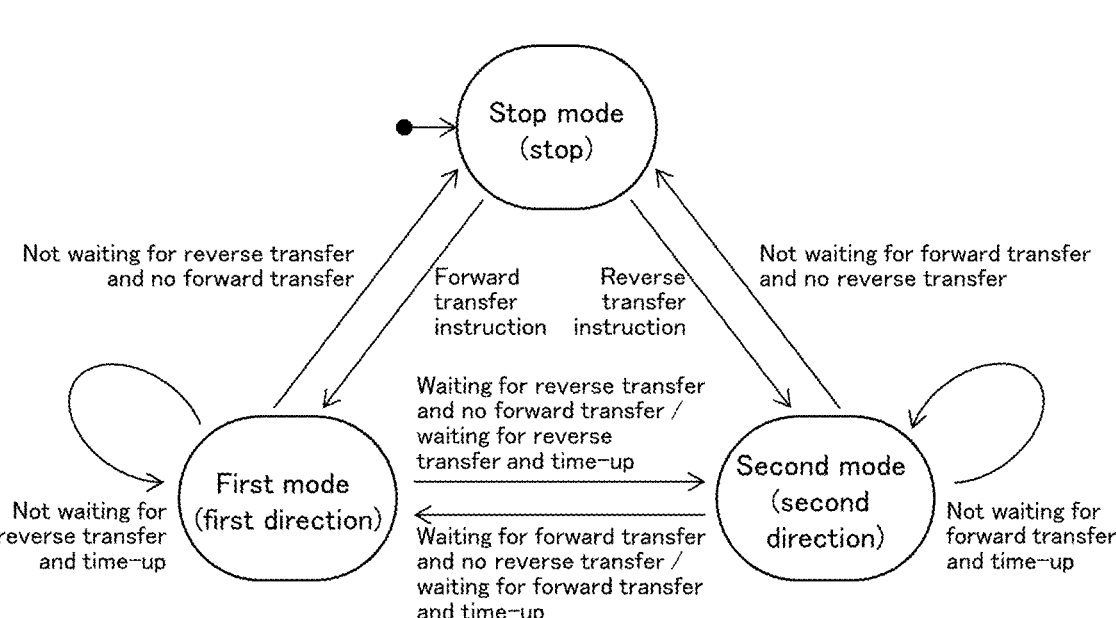
FIG. 3 is a state transition diagram illustrating three operation modes of the transfer system in accordance with the first embodiment of the present invention.

Next, with reference to FIG. 3, the following description will discuss, in details, how the control device 50 operates and the devices specifically operate according to an instruction from the control device 50 so as to realize the whole of the operation of the transfer system 1, an overview of which has been discussed above. FIG. 3 is a state transition diagram illustrating a stop mode, a first mode, and a second mode, which are three operation modes of the transfer system 1.

In any of the operation modes of the transfer system 1, the control device 50 executes, as an interrupt process, a process of writing information into the forward transfer waiting list L1 or the reverse transfer waiting list L2 in the below-described manner. Note that, when in a default state, each of the lists includes no information relating to a transfer target B.

Upon reception, from the higher system 2, an instruction to cause an article housed in the first device 10 to be transferred from the first device 10 to the second device 20, the control device 50 adds, as a transfer target B, the article to the forward transfer waiting list L1 in the storage section 52. When receiving, from the higher system 2, an instruction to cause an article housed in the second device 20 to be transferred from the second device 20 to the first device 10, the control device 50 adds, as a transfer target B, the article to the reverse transfer waiting list L2 in the storage section 52.

<Details of Operation: Stop Mode>

In an initial state of the transfer system 1, the transfer control section 51 of the control device 50 determines that the operation mode of the transfer system 1 is the stop mode. When the operation mode of the transfer system 1 transitions to the stop mode, the transfer control section 51 gives, to the bidirectional conveyor device 30, an instruction to stop the conveyor mechanism section 32.

When a transfer target B is listed on the forward transfer waiting list L1 in the stop mode, the transfer control section 51 determines to cause a transition of the operation mode of the transfer system 1 to the first mode ("forward transfer instruction" in FIG. 3). If a transfer target B is listed on the reverse transfer waiting list L2 in the stop mode, the transfer control section 51 determines to cause a transition of the operation mode of the transfer system 1 to the second mode ("reverse transfer instruction" in FIG. 3).

<Details of Operation: First Mode>

When the state of the transfer system 1 transitions to the first mode, the transfer control section 51 of the control device 50 starts counting of the first period. Further, the transfer control section 51 gives, to the bidirectional conveyor device 30, an instruction to cause the conveyor mechanism section 32 to execute forward transfer.

Upon reception of this instruction from the control device 50, the conveyor control section 31 of the bidirectional conveyor device 30 controls the conveyor mechanism section 32 so that the conveyor mechanism section 32 executes forward transfer, i.e., the conveyor mechanism section 32 transfers a transfer target placed thereon in the forward direction D1 (first direction). Further, the transfer control section 51 gives, to the second device 20, an instruction to enter the reception waiting state. Upon reception of this instruction from the control device 50, the second control section 21 of the second device 20 controls the second mechanism section 22 so as to bring the second device 20 into the reception waiting state.

In the first mode, for transfer targets B on the forward transfer waiting list L1, the transfer control section 51 sequentially gives, to the first device 10, instructions to deliver the transfer targets B to the bidirectional conveyor device 30. In this case, the transfer control section 51 deletes, from the forward transfer waiting list L1, the transfer target B for which the delivery instruction has been given to the first device 10; then, the transfer control section 51 writes, into the in-transfer list L3, the transfer target B thus deleted. Every time the first control section 11 of the first device 10 receives this instruction from the control device 50, the first control section 11 controls the first mechanism section 12 to deliver the transfer target B to the bidirectional conveyor device 30 at the first position P1.

When receiving, from the second device 20, a report indicating that a transfer target B has arrived at the second position P2, the control device 50 deletes information relating to this transfer target B from the in-transfer list L3 as the interrupt process. In this manner, the forward transfer waiting list L1 indicates, in real time, that a transfer target(s) B on the forward transfer waiting list L1 is/are waiting for being transferred toward the second device 20. Further, in the first mode, the in-transfer list L3 indicates, in real time, that a transfer target(s) B on the in-transfer list L3 is/are being transferred toward the second device 20.

In a case where there is no more transfer target B on the forward transfer waiting list L1, if a transfer target B is on the reverse transfer waiting list L2 after the in-transfer list L3 is brought into a state in which no transfer target B is left, the transfer control section 51 determines to cause a transition of the operation mode of the transfer system 1 to the second mode ("waiting for reverse transfer and no forward transfer" in FIG. 3). This is carried out to make it possible to transfer from the second device 20 to the first device 10 even before the first period expires, which enhances the efficiency of transfer of the transfer target B.

In a case where there is no more transfer target B on the forward transfer waiting list L1, if no transfer target B is on the reverse transfer waiting list L2, the transfer control section 51 determines, after the in-transfer list L3 is brought into a state in which no transfer target B is left, to cause a transition of the operation mode of the transfer system 1 to the stop mode ("not waiting for reverse transfer and no forward transfer" in FIG. 3). This is carried out to stop unnecessary operation of the bidirectional conveyor device 30, which reduces energy consumption.

In a case where the first period expires, i.e., the first period has been elapsed since a transition to the first mode, the transfer control section 51 stops issuance of an instruction to deliver the transfer target B to the first device 10. If a transfer target B is on the reverse transfer waiting list L2 after the in-transfer list L3 is brought into a state in which no transfer target B is left, the transfer control section 51 determines to cause a transition of the operation mode of the transfer system 1 to the second mode ("waiting for reverse transfer and time-up" in FIG. 3). This is carried out for the following reason. That is, carrying out the first mode and the second mode alternately can realize bidirectional transfer of the transfer target B.

If no transfer target B is on the reverse transfer waiting list L2 after the in-transfer list L3 is brought into a state in which no transfer target B is left, the transfer control section 51 determines to cause a transition of the operation mode of the transfer system 1 again to the first mode ("waiting for reverse transfer and time-up" in FIG. 3). This is carried out to make it possible to transfer the transfer target B from the first device 10 to the second device 20 in succession, which enhances the efficiency of transfer of the transfer target B. In a case where a transition takes place from the first mode again to the first mode, the transfer control section 51 may carry out a process for shortening the first period than that in a normal state.

<Details of Operation: Second Mode>

When the state of the transfer system 1 transitions to the second mode, the transfer control section 51 of the control device 50 starts counting of the second period. Further, the transfer control section 51 gives, to the bidirectional conveyor device 30, an instruction to cause the conveyor mechanism section 32 to execute reverse transfer.

Upon reception of this instruction from the control device 50, the conveyor control section 31 of the bidirectional conveyor device 30 controls the conveyor mechanism section 32 so that the conveyor mechanism section 32 executes reverse transfer, i.e., the conveyor mechanism section 32 transfers a transfer target placed thereon in the reverse direction D2 (second direction). Further, the transfer control section 51 gives, to the first device 10, an instruction to enter the reception waiting state. Upon reception of this instruction from the control device 50, the first control section 11 of the first device 10 controls the first mechanism section 12 so as to bring the first device 10 into the reception waiting state.

In the second mode, for transfer targets B on the reverse transfer waiting list L2, the transfer control section 51 sequentially gives, to the second device 20, instructions to deliver the transfer targets B to the bidirectional conveyor device 30. In this case, the transfer control section 51 deletes, from the reverse transfer waiting list L2, the transfer target B for which the deliver instruction has been given to the second device 20; then, the transfer control section 51 writes, into the in-transfer list L3, the transfer target B thus deleted. Every time the second control section 21 of the second device 20 receives this instruction from the control device 50, the second control section 21 controls the second mechanism section 22 to deliver the transfer target B to the bidirectional conveyor device 30 at the second position P2.

When receiving, from the first device 10, a report indicating that a transfer target B has arrived at the first position P1, the control device 50 deletes information relating to this transfer target B from the in-transfer list L3 as the interrupt process. In this manner, the reverse transfer waiting list L2 indicates, in real time, that a transfer target(s) B on the reverse transfer waiting list L2 is/are waiting for being transferred toward the first device 10. Further, in the second mode, the in-transfer list L3 indicates, in real time, that a transfer target(s) B on the in-transfer list L3 is/are being transferred toward the first device 10.

In a case where there is no more transfer target B on the reverse transfer waiting list L2, if a transfer target B is on the forward transfer waiting list L1 after the in-transfer list L3 is brought into a state in which no transfer target B is left, the transfer control section 51 determines to cause a transition of the operation mode of the transfer system 1 to the first mode ("waiting for forward transfer and no reverse transfer" in FIG. 3). This is carried out to make it possible to transfer from the first device 10 to the second device 20 even before the second period expires, which enhances the efficiency of transfer of the transfer target B.

In a case where there is no more transfer target B on the reverse transfer waiting list L2, if no transfer target B is on the forward transfer waiting list L1, the transfer control section 51 determines, after the in-transfer list L3 is brought into a state in which no transfer target B is left, to cause a transition of the operation mode of the transfer system 1 to the stop mode ("not waiting for forward transfer and no reverse transfer" in FIG. 3). This is carried out to stop unnecessary operation of the bidirectional conveyor device 30 to reduce energy consumption.

In a case where the second period expires, i.e., the second period has been elapsed since a transition to the second period, the transfer control section 51 stops issuance of an instruction to deliver the transfer target B to the second device 20. If a transfer target B is on the forward transfer waiting list L1 after the in-transfer list L3 is brought into a state in which no transfer target B is left, the transfer control section 51 determines to cause a transition of the operation mode of the transfer system 1 to the first mode ("waiting for forward transfer and time-up" in FIG. 3). This is carried out for the following reason. That is, carrying out the first mode and the second mode alternately can realize bidirectional transfer of the transfer target B.

If no transfer target B is on the forward transfer waiting list L1 after the in-transfer list L3 is brought into a state in which no transfer target B is left, the transfer control section 51 determines to cause a transition of the operation mode of the transfer system 1 again to the second mode ("waiting for forward transfer and time-up" in FIG. 3). This is carried out to make it possible to transfer the transfer target B from the second device 20 to the first device 10 in succession, which enhances the efficiency of transfer of the transfer target B. In a case where a transition takes place from the second mode again to the second mode, the transfer control section 51 may carry out a process for shortening the second period than that in a normal state.

Second Embodiment

The following will give a description of another embodiment of the present invention. Note that, for convenience, members having identical functions to those of the first embodiment are given identical reference signs, and a description thereof will be omitted.

Figure 4:
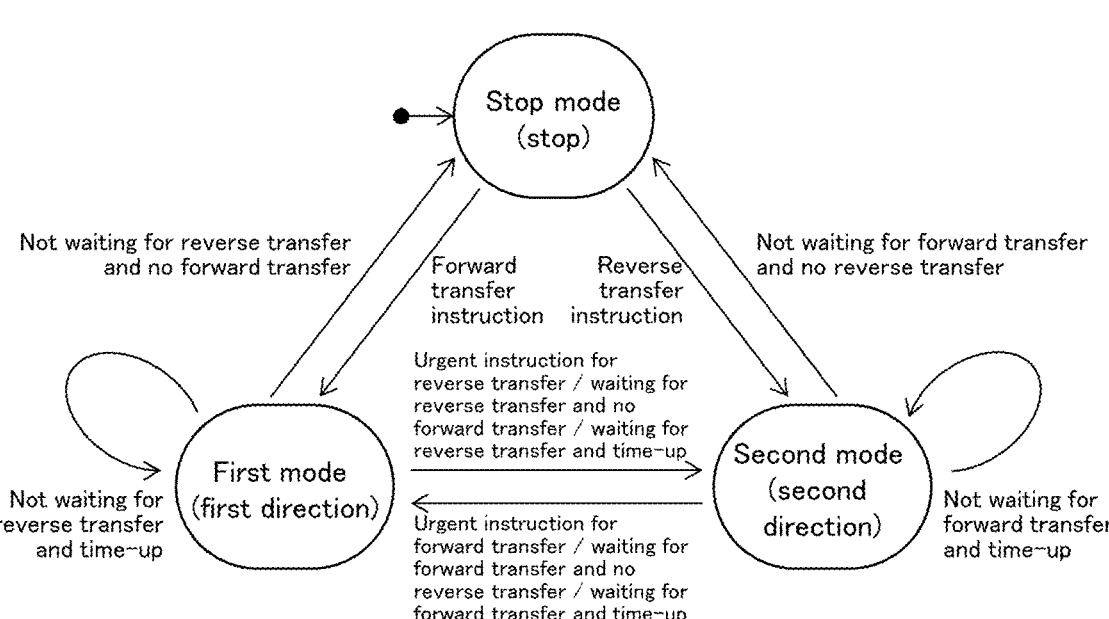
FIG. 4 is a state transition diagram illustrating three operation modes of a transfer system in accordance with a second embodiment of the present invention.

A transfer system 1 in accordance with a second embodiment is the same as the transfer system 1 of the first embodiment, except that a control device 50 receives, from a higher system 2, an instruction to transfer an article as well as a priority as to a transfer target B to be transferred and carries out a process according to the priority. The following will discuss, with reference to a state transition diagram of the second embodiment shown in FIG. 4, differences between the first embodiment and the second embodiment.

Note that the expression "higher priority" refers to a higher level of need to carry out transfer at an early timing, whereas the expression "lower priority" refers to a lower level of need to carry out transfer at an early timing. Further, it is assumed that, in the following description, the priority is indicated by a numerical value from 0 to 100, for example, and a numerical value closer to 100 indicates a "higher priority". In the transfer system 1 in accordance with the second embodiment, thresholds of the priority are respectively for a first device 10 and a second device 20. For example, assume that the threshold for the first device 10 is set at 50 and the threshold for the second device 20 is set at 70.

Assume that, in a case where an operation mode of the transfer system 1 is a first mode, a priority of a transfer instruction to transfer an article from the second device 20 to the first device 10 which transfer instruction is given from the higher system 2 to the control device 50 is less than 70, which is the threshold set for the second device 20. In this case, the transfer system 1 operates in the same manner as that in the first embodiment, except for the following points. During a first period, a transfer control section 51 of the control device 50 gives, to the first device 10, an instruction to deliver, to a bidirectional conveyor device 30, transfer targets B on a forward transfer waiting list L1 in a descending order of priority.

Meanwhile, assume that, in a case where the operation mode of the transfer system 1 is the first mode, a priority of a transfer instruction to transfer an article from the second device 20 to the first device 10 which transfer instruction is given from the higher system 2 to the control device 50 is not less than 70, which is the threshold set for the second device. In this case, the transfer control section 51 of the control device 50 determines to cause an immediate transition of the operation mode of the transfer system 1 to a second mode ("urgent instruction for reverse transfer" in FIG. 4).

During a second period of the second mode, the transfer control section 51 of the control device 50 gives, to the second device 20, an instruction to deliver, to the bidirectional conveyor device 30, transfer targets B on a reverse transfer waiting list L2 in a descending order of priority. When the first device 10 is brought into a reception waiting state as a result of a transition to the second mode, the first device 10 receives a transfer target B having arrived at a first position P1 as a result of transfer carried out by a conveyor mechanism section 32 of the bidirectional conveyor device 30 and gives a report indicative of that to the transfer control section 51.

Upon reception of the reception report from the first device 10, the transfer control section 51 causes information of a transfer target B which is on an in-transfer list L3 when a transition to the second mode takes place to be transferred from the in-transfer list L3 to the forward transfer waiting list L1. This is carried out in order to bring the transfer target B into the forward transfer waiting state again.

Assume that, in a case where the operation mode of the transfer system 1 is the second mode, a priority of a transfer instruction to transfer an article from the first device 10 to the second device 20 which transfer instruction is given from the higher system 2 to the control device 50 is less than 50, which is the threshold set for the first device 10. In this case, the transfer system 1 operates in the same manner as that in the first embodiment, except for the following points. During the second period, the transfer control section 51 of the control device 50 gives, to the second device 20, an instruction to deliver, to the bidirectional conveyor device 30, transfer targets B on the reverse transfer waiting list L2 in a descending order of priority.

Meanwhile, assume that, in a case where the operation mode of the transfer system 1 is the second mode, a priority of a transfer instruction to transfer an article from the first device 10 to the second device 20 which transfer instruction is given from the higher system 2 to the control device 50 is not less than 50, which is the threshold set for the first device. In this case, the transfer control section 51 of the control device 50 determines to cause an immediate transition of the operation mode of the transfer system 1 to the first mode ("urgent instruction for forward transfer" in FIG. 4).

During the first period of the first mode, the transfer control section 51 of the control device 50 gives, to the first device 10, an instruction to deliver, to the bidirectional conveyor device 30, transfer targets B on the forward transfer waiting list L1 in a descending order of priority. When the second device 20 is brought into the reception waiting state as a result of a transition to the first mode, the second device 20 receives a transfer target B having arrived at the second position P2 as a result of transfer carried out by the conveyor mechanism section 32 of the bidirectional conveyor device 30 and gives a report indicative of that to the transfer control section 51.

Upon reception of the reception report from the second device 20, the transfer control section 51 causes information of a transfer target B which is on the in-transfer list L3 when a transition to the first mode takes place to be transferred from the in-transfer list L3 to the reverse transfer waiting list L2. This is carried out in order to bring the transfer target B into the reverse transfer waiting state again.

According to the transfer system 1 of the second embodiment, a transfer target having a high level of need to be transferred at an early timing can be transferred at an early timing according to the priority, regardless of the mode of the transfer system 1. The foregoing description in the second embodiment has dealt with the example employing the priority set by a numerical value. The information as to the priority that is transferred from the higher system 2 to the control device 50 may be information indicative of whether or not priority should be assigned to it (whether or not it should be transferred urgently).

Third Embodiment

Figure 5:
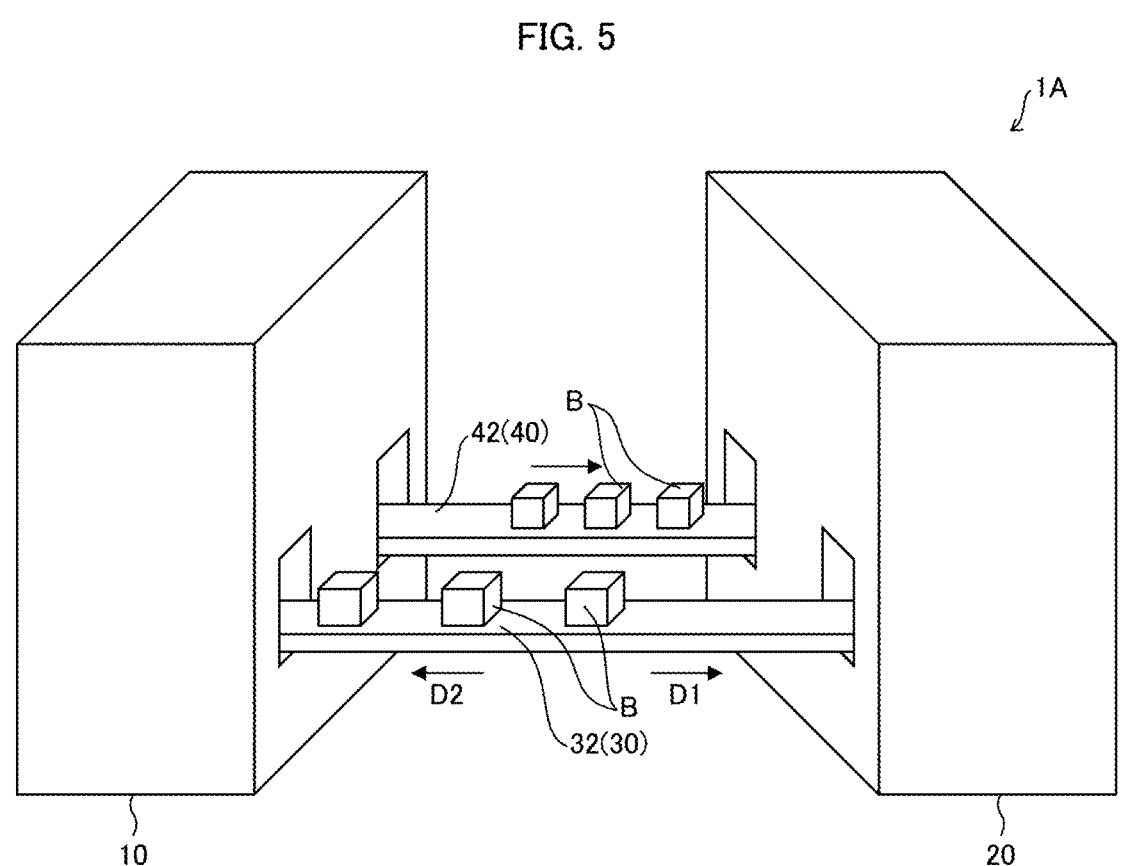
FIG. 5 is a view illustrating an overview of a transfer system in accordance with a third embodiment of the present invention.

FIG. 5 is a view illustrating an overview of a transfer system 1A in accordance with a third embodiment of the present invention. The transfer system 1A further includes, in addition to the configuration of the transfer system 1 in accordance with the first embodiment, a single-direction conveyor device 40 provided with a conveyor mechanism 42 capable of transferring a transfer target B from a first device 10 to a second device 20 only in a single direction.

In the transfer system 1A in accordance with the third embodiment, the single-direction conveyor device 40 is used in preference to a bidirectional conveyor device 30 in order to transfer a transfer target B from the first device 10 to the second device 20. Thus, in a case where the number of transfer targets B being in a transfer waiting state, among transfer targets B which are to be transferred from the first device 10 to the second device 20, is not more than a predetermined number, the transfer system 1A of the third embodiment assumes that there is no transfer target B which is to be transferred from the first device 10 to the second device 20 by use of the bidirectional conveyor device 30. In this case, the transfer target B which is to be transferred from the first device 10 to the second device 20 is transferred by the single-direction conveyor device 40.

That is, the transfer system 1A in accordance with the third embodiment deals with, as the transfer targets B which are to be listed on the forward transfer waiting list L1 in the first embodiment, transfer targets B which are waiting for being transferred from the first device 10 to the second device 20 and whose number exceeds the predetermined number. The other parts of the operation of the bidirectional conveyor device 30 of the transfer system 1A are the same as those of the transfer system 1 in accordance with the first embodiment.

The transfer system 1A may further include a single-direction conveyor device provided with a single-direction conveyor mechanism capable of transferring a transfer target B only in a single direction from the second device 20 to the first device 10. Also in this case, a transfer target(s) B to be transferred from the second device 20 to the first device 10 by use of the bidirectional conveyor device 30 is/are selected in the same manner.

Thanks to the configuration including the single-direction conveyor device in addition to the bidirectional conveyor device 30, the transfer system 1A of the third embodiment can realize flexible and efficient transfer according to the number of transfer targets B.

Software Implementation Example

Functions of the control device 50, the first control section 11, the second control section 21, and the conveyor control section 31 (hereinafter referred to as a "device") can be realized by a program for causing a computer to function as the device.

In this case, the device includes, as hardware for executing the program, a computer which includes (i) at least one general-purpose control device (e.g., processor) and (ii) at least one storage device (e.g., memory). By the general-purpose control device and the storage device executing the program, the functions described in the above embodiments are realized.

The program may be stored in one or more non-transitory and computer-readable storage media. The one or more storage media may or may not be provided to the device. In the latter case, the program may be supplied to or made available to the device via any wired or wireless transmission medium.

Further, some or all of the functions of the control blocks can be realized by a logic circuit. For example, the present invention encompasses, in its scope, an integrated circuit in which a logic circuit that functions as each of the control blocks is formed. In addition, the function of each of the control blocks can be realized by, for example, a quantum computer.

Summary

A transfer system in accordance with a first aspect of the present disclosure includes: a bidirectional conveyor device including a conveyor mechanism capable of transferring a transfer target bidirectionally; and a control device, the control device being configured to control the bidirectional conveyor device to execute a first mode and a second mode alternately, the first mode being a transfer mode for transferring a transfer target on the conveyor mechanism in a first direction, the second mode being a transfer mode for transferring a transfer target on the conveyor mechanism in a second direction reverse to the first direction, the control device being further configured to continue the first mode according to a predetermined first period defining a duration of the first mode.

A transfer system in accordance with a second aspect of the present disclosure is configured, in the first aspect, as follows: in a case where, during the first period, there is no more transfer target which is to be transferred in the first mode and there is a transfer target which is to be transferred in the second mode, the control device executes, even before the first period ends, the second mode after given transfer of a transfer target which is being transferred is completed.

A transfer system in accordance with a third aspect of the present disclosure is configured such that, in the second or third aspect, the transfer system further includes: a first device configured to deliver or receive a transfer target to or from the bidirectional conveyor device at a first position on the conveyor mechanism; and a second device configured to deliver or receive a transfer target to or from the bidirectional conveyor device at a second position on the conveyor mechanism, wherein: the control device controls the bidirectional conveyor device, the first device, and the second device so that (i) in the first mode, a transfer target which is to be transferred from the first device to the second device by use of the bidirectional conveyor device is transferred via the bidirectional conveyor device and (ii) in the second mode, a transfer target which is to be transferred from the second device to the first device by use of the bidirectional conveyor device is transferred via the bidirectional conveyor device; and in a case where, during the first period, there is no more transfer target which is to be transferred from the first device to the second device by use of the bidirectional conveyor device and there is a transfer target which is to be transferred from the second device to the first device by use of the bidirectional conveyor device, the control device executes, even before the first period ends, the second mode after the transfer target which is being transferred arrives at the second position.

A transfer system in accordance with a fourth aspect of the present disclosure is configured, in the third aspect, as follows: in a case where, while the first mode is in execution, the first period ends and there is a transfer target which is to be transferred from the first device to the second device by use of the bidirectional conveyor device, the control device executes the second mode after the transfer target which is being transferred arrives at the second position.

A transfer system in accordance with a fifth aspect of the present disclosure is configured, in the third or fourth aspect, as follows: a priority is set for each transfer target, the priority indicating a level of need to carry out transfer at an early timing; and in a case where, while the first mode is in execution, there occurs a transfer target which is to be transferred from the second device to the first device by use of the bidirectional conveyor device and which has a priority of not less than a predetermined threshold, the control device immediately ends the first mode and executes the second mode.

A transfer system in accordance with a sixth aspect of the present disclosure is configured such that, in the third or fourth aspect, the transfer system further includes: a single-direction conveyor device capable of transferring a transfer target in a single direction from the first device to the second device, wherein in a case where the number of transfer targets to be transferred from the first device to the second device is not more than a predetermined number, the control device assumes that there is no transfer target which is to be transferred from the first device to the second device by use of the bidirectional conveyor device, and the control device causes the transfer target which is to be transferred from the first device to the second device to be transferred via the single-direction conveyor device.

The present invention is not limited to the embodiments, but can be altered by a skilled person in the art within the scope of the claims. The present disclosure also encompasses, in its technical scope, any embodiment derived by combining technical means disclosed in differing embodiments.

REFERENCE SIGNS LIST

1, 1A: transfer system
10: first device
11: first control section
12: first mechanism section
20: second device
21: second control section
22: second mechanism section
30: bidirectional conveyor device
31: conveyor control section
32: conveyor mechanism section (conveyor mechanism)

D1: first direction, forward direction
D2: second direction, reverse direction
P1: first position
P2: second position
40: single-direction conveyor device
42: conveyor mechanism
50: control device
51: transfer control section
52: storage section
L1: forward transfer waiting list
L2: reverse transfer waiting list
L3: in-transfer list

The invention claimed is:

1. A transfer system comprising:
a bidirectional conveyor device including a conveyor mechanism capable of transferring a transfer target bidirectionally; and
a control device,
the control device being configured to control the bidirectional conveyor device to execute a first mode and a second mode alternately, the first mode being a transfer mode for transferring a transfer target on the conveyor mechanism in a first direction, the second mode being a transfer mode for transferring a transfer target on the conveyor mechanism in a second direction reverse to the first direction,
the control device being further configured to continue the first mode according to a predetermined first period defining a duration of the first mode, wherein
in a case where, during the first period, there is no more transfer target which is to be transferred in the first mode and which is waiting for being transferred and there is a transfer target which is to be transferred in the second mode and which is waiting for being transferred, the control device executes, even before the first period ends, the second mode after given transfer of a transfer target which is being transferred is completed.

2. A transfer system, comprising:
a bidirectional conveyor device including a conveyor mechanism capable of transferring a transfer target bidirectionally; and
a control device, the control device being configured to control the bidirectional conveyor device to execute a first mode and a second mode alternately, the first mode being a transfer mode for transferring a transfer target on the conveyor mechanism in a first direction, the second mode being a transfer mode for transferring a transfer target on the conveyor mechanism in a second direction reverse to the first direction, and
the control device being further configured to continue the first mode according to a predetermined first period defining a duration of the first mode;
a first device configured to deliver or receive a transfer target to or from the bidirectional conveyor device at a first position on the conveyor mechanism; and a second device configured to deliver or receive a transfer target to or from the bidirectional conveyor device at a second position on the conveyor mechanism, wherein:
the control device controls the bidirectional conveyor device, the first device, and the second device so that (i) in the first mode, a transfer target which is to be transferred from the first device to the second device by use of the bidirectional conveyor device is transferred via the bidirectional conveyor device and (ii) in the second mode, a transfer target which is to be transferred from the second device to the first device by use of the bidirectional conveyor device is transferred via the bidirectional conveyor device; and
in a case where, during the first period, there is no more transfer target which is to be transferred from the first device to the second device by use of the bidirectional conveyor device and there is a transfer target which is to be transferred from the second device to the first device by use of the bidirectional conveyor device, the control device executes, even before the first period ends, the second mode after the transfer target which is being transferred arrives at the second position.

3. The transfer system according to claim 2, wherein:
in a case where, while the first mode is in execution, the first period ends and there is a transfer target which is to be transferred from the first device to the second device by use of the bidirectional conveyor device, the control device executes the second mode after the transfer target which is being transferred arrives at the second position.

4. The transfer system according to claim 2, wherein:
a priority is set for each transfer target, the priority indicating a level of need to carry out transfer at an early timing; and
in a case where, while the first mode is in execution, there occurs a transfer target which is to be transferred from the second device to the first device by use of the bidirectional conveyor device and which has a priority of not less than a predetermined threshold, the control device immediately ends the first mode and executes the second mode.

5. The transfer system according to claim 2, further comprising:
a single-direction conveyor device capable of transferring a transfer target in a single direction from the first device to the second device, wherein
in a case where the number of transfer targets to be transferred from the first device to the second device is not more than a predetermined number, the control device assumes that there is no transfer target which is to be transferred from the first device to the second device by use of the bidirectional conveyor device and the control device causes the transfer target which is to be transferred from the first device to the second device to be transferred via the single-direction conveyor device.

* * * * *